(12) United States Patent
Minowa et al.

(10) Patent No.: US 6,408,161 B1
(45) Date of Patent: Jun. 18, 2002

(54) IMAGE READING APPARATUS AND IMAGE INFORMATION PROCESS APPARATUS

(75) Inventors: Masahiro Minowa; Yukihiro Hanaoka, both of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/535,646

(22) Filed: Mar. 24, 2000

(30) Foreign Application Priority Data

Mar. 26, 1999 (JP) .............................. 11-84758
Jun. 3, 1999 (JP) .......................... 11-156475
Mar. 13, 2000 (JP) .......................... 2000-69397

(51) Int. Cl.⁷ .............................................. G03G 15/00
(52) U.S. Cl. ..................................................... 399/380
(58) Field of Search ................................ 399/380, 369, 399/367, 377, 379, 118

(56) References Cited

U.S. PATENT DOCUMENTS

| 5,119,212 A | | 6/1992 | Mori et al. |
| 5,250,981 A | | 10/1993 | Greene |
| 5,448,340 A | | 9/1995 | Ogiri et al. |
| 5,940,659 A | * | 8/1999 | Rieck .......................... 399/124 |
| 6,163,668 A | * | 12/2000 | Takahashi et al. .......... 399/144 |

FOREIGN PATENT DOCUMENTS

| EP | 0 673 147 | 9/1995 |
| JP | 7-200246-a | * 8/1995 |
| JP | 8-17325-a | * 7/1996 |

* cited by examiner

Primary Examiner—Quana M. Grainger
(74) Attorney, Agent, or Firm—Nixon & Vanderhye P.C.

(57) ABSTRACT

An image reader includes a main unit having a plate-like document holder on which an original document is to be placed, and an image reading section for reading an image carried by the original document. The image reader further has a cover secured to the main unit. The cover can be turned to open and close a space on the document holder. The cover is turnable about a first axis defined by a straight line extending in a first direction substantially on the plane of the document holder. At least part of the cover is turnable about a second axis defined by a straight line extending in a second direction which is substantially orthogonal to the first direction. The image reader can be placed on, for example, a desk top selectively either in a horizontal posture in which the document holder extends substantially parallel to the desk top plane or a vertical posture in which the document holder extends substantially vertically to the desk top plane. The image reader reads an image of an original document regardless of the posture of the main unit and can be installed so as to meet a space requirement, through suitable selection of the direction in which the cover is turned to open or close it. Also disclosed is an image information processing apparatus incorporating this image reader.

23 Claims, 17 Drawing Sheets

IMAGE READING APPARATUS AND IMAGE INFORMATION PROCESS APPARATUS

TECHNICAL FIELD

The present invention relates to image reading apparatuses, and, more particularly, to an image reading apparatus having a cover which serves to press the original document onto the document holder, and an image information processing apparatus.

BACKGROUND

In general, image reading apparatuses are known in which light rays are use to scan an original document (simply referred to as "document" hereinafter) and the light rays reflected from the document are converted by an image sensor into electrical signals representing the image of the original document.

This type of image reading apparatus comprises a main unit provided at its top with a glass plate, which forms the flat document holder and extends over almost the entire area of the upper side of the main unit. A cover is pivotally mounted on the main unit with the pivot axis defined by pivot shafts arranged along one side edge of the top of the main unit. Thus, the cover is adapted to be turned between an "open" position leaving the glass plate uncovered and a "closed" position where it covers the glass plate.

In its open position, the cover permits a document to be placed on the glass plate. In its closed position, the cover presses the document onto the glass plate.

Image reading apparatuses of the flat bed type described above suffer from the following problems.

While image reading apparatuses can be used for scanning a variety of documents including books, they occupy a large space on a desk. Another problem is that, for the purpose of easy handling of the cover, ample space is required to accommodate the cover when it is turned to the open position. This imposes restrictions regarding possible positions or orientations of the image reading apparatus. There are paper-feeding type small image scanners wherein only sheet-like documents can pass through a portion with an image sensor. These scanners can not be used to scan from a book-like document, however.

SUMMARY

In one aspect, an image reading apparatus is featured, including a main unit having a document holding plate on which an original document is to be placed, and an image reading section for reading an image from an original document placed on the document holding plate and a cover secured to the main unit so as to be turned between an open position in which a document can be set on or removed from the document holding plate, and a closed position in which it covers the document holding plate, wherein the cover can be turned about a first axis extending in a first direction substantially on the plane of the document holding plate, and wherein at least part of the cover can be turned about a second axis extending in a second direction which is substantially orthogonal to the first direction.

In an implementation, the cover of the image reading apparatus can be turned selectively either in a direction in which it pivots about the first axis or a direction in which it pivots about the second axis.

The main unit has support portions such that it can be installed selectively either in a horizontal posture in which the document holder is oriented substantially in parallel with a support plane such as the plane of a desk top or in a vertical posture in which the document holder is oriented perpendicularly to the support plane. Users who usually read images on thin documents may use the main unit normally in the vertical posture, such that one side of the main unit having one of the axes is positioned closer to the support plane. In such a use, the space on the document holder becomes accessible for setting a document therein from the upper side. The user can re-install the main unit in the horizontal posture whenever necessary. It is thus possible to reduce the space for installation of the image reading apparatus.

In an implementation, the image reading apparatus is equipped with at least one leg section in which a leg member is movably fixed to the main unit such that it can be moved between an open or active position and a closed or inactive position. When the main unit is to be placed in the vertical posture the leg member is turned into its active position, while it is set in the inactive position when the main unit is to be placed in the horizontal posture. As a result, it is possible for the main unit to stably stand in the vertical posture. Any obstruction by the leg section in the horizontal posture of the main unit can be avoided. Also, a user can select the posture corresponding to his way of working or the space on his desk.

In another implementation, various kinds of hinge structures provide the functions of the first and second supporting shaft members.

In another aspect, an image information processing apparatus such as a copying machine, a facsimile apparatus, and so on, incorporating an image reading apparatus is featured.

One advantage is that the image reading apparatus has a small foot print and can read an image on a book type document when needed.

Another advantage is that the image reading apparatus can be installed in a variety of different orientations while affording easy opening and closing operations of a cover.

Still another advantage is that the image reading apparatus has a cover which can be opened and closed in a plurality of directions.

A further advantage is that the image reading apparatus can be used either in a posture in which a document holder lies horizontally or in a posture in which the document holder is held vertical.

The details of one or more embodiments of the invention are set forth in the accompanying drawings and the description below. Other features, implementations and advantages of the invention will be apparent from the description and drawings, and from the claims.

DESCRIPTION OF DRAWINGS

Like reference symbols in the various drawings indicate like elements.

DETAILED DESCRIPTION

Figure 1:
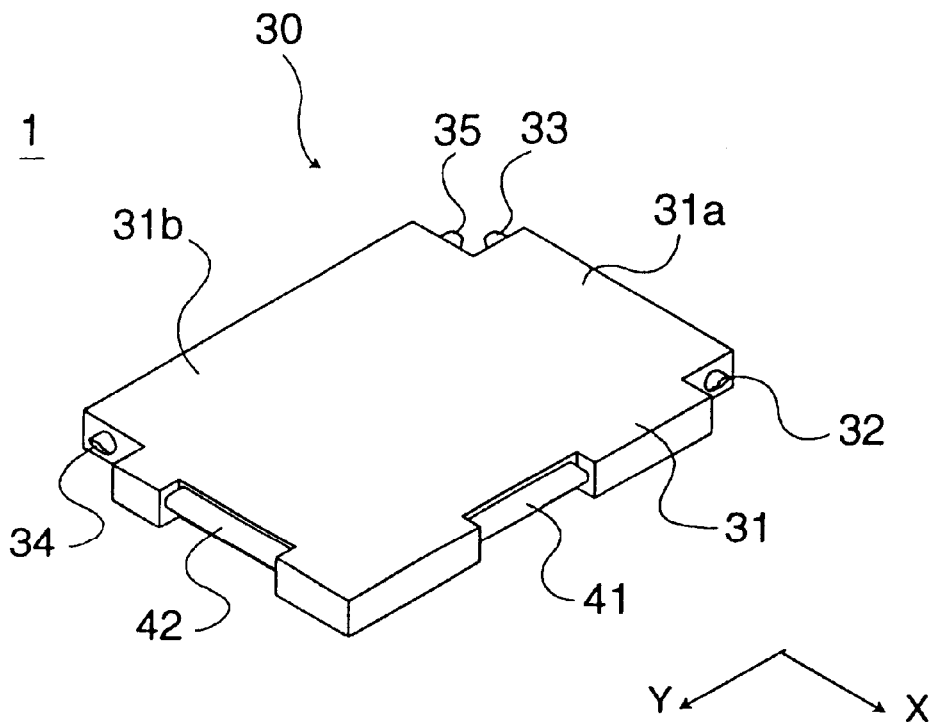
FIG. 1 is an exploded perspective view of a first embodiment of the image reading apparatus, with a cover separated from a main unit.
Figure 1:
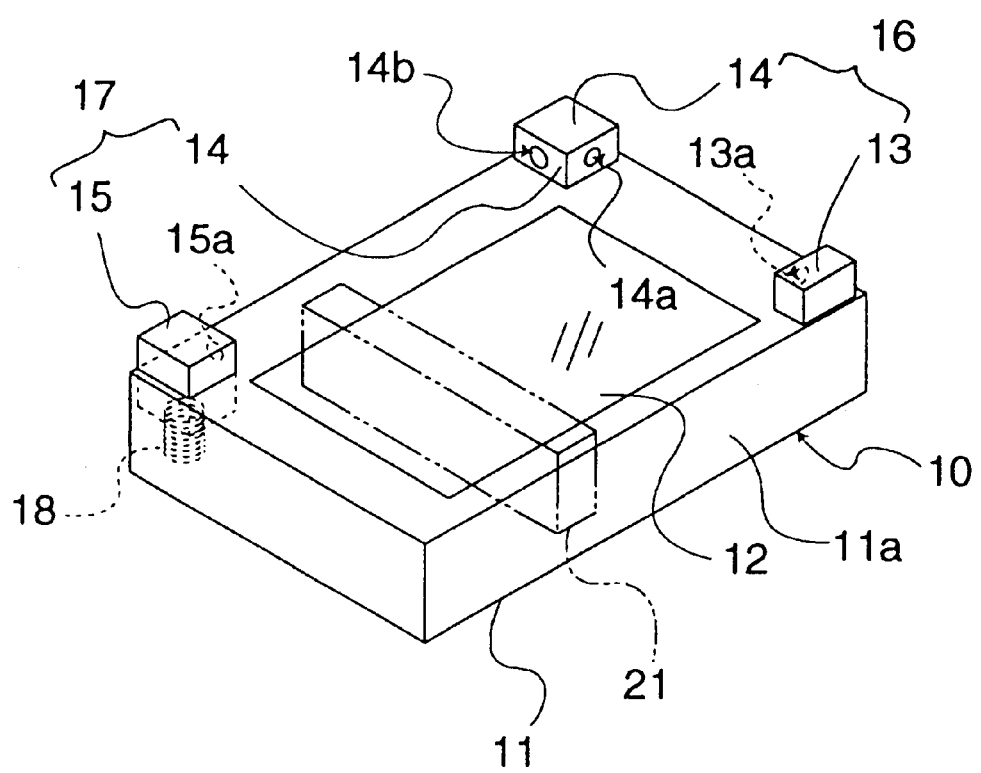

Referring to FIG. 1, an image reading apparatus 1 (hereafter, referred to as "image reader") has a main unit 10 in the form of a substantially rectangular parallelepiped, and a substantially rectangular tabular cover unit (referred to also as a "cover") 30. In this embodiment, the cover 30 is detachably mounted on the main unit 10, by a structure is described below in detail.

The main unit 10 has a box-like housing 11 made of, for example, a synthetic resin. The top face of the housing 11 is covered with a rectangular transparent plate 12 such as a glass plate embedded therein and forming a flat document holder. A document to be scanned is placed on the plate 12 (referred to as "glass plate" hereinafter). The housing 11 has a plurality of support members 13, 14, 15 each being retractably mounted on the top face of the main unit 10 at its corners. The support members 13, 14 form a first cover support section 16 and the support members 14, 15 form a second cover support section 17. In plan view, the housing 11 has a rectangular shape with shorter sides and longer sides. The direction in which the shorter sides extend will be referred to as "X" direction, while the direction of the longer sides will be referred to as "Y" direction. Engagement holes 13a and 14a, which are engageable with later-mentioned first support shafts 32 and 33, respectively, are formed in the opposing side surfaces of the support members 13 and 14, and engagement holes 14b and 15a, which are engageable with second support shafts 34 and 35, respectively, are formed in the opposing surfaces of the support members 14 and 15.

Each of the support members 13, 14, 15 is urged by a compression spring 18 so as to be projected upward into a "projected" position, but is retracted into the housing to a "retracted" position where the top surface of the respective support member 13, 14, 15 is substantially flush with the top face, i.e., the document holding surface of the main unit 10 when it is pressed by a heavy book type document or the like.

A scanner unit (image reading unit) 21 having a line sensor is installed inside the main unit 10, for reciprocal movement along the Y direction. The scanner unit 21 while traveling in the Y direction reads information on each of X-direction lines, thereby reading an image carried by a document placed on the glass plate 12.

Figure 2:
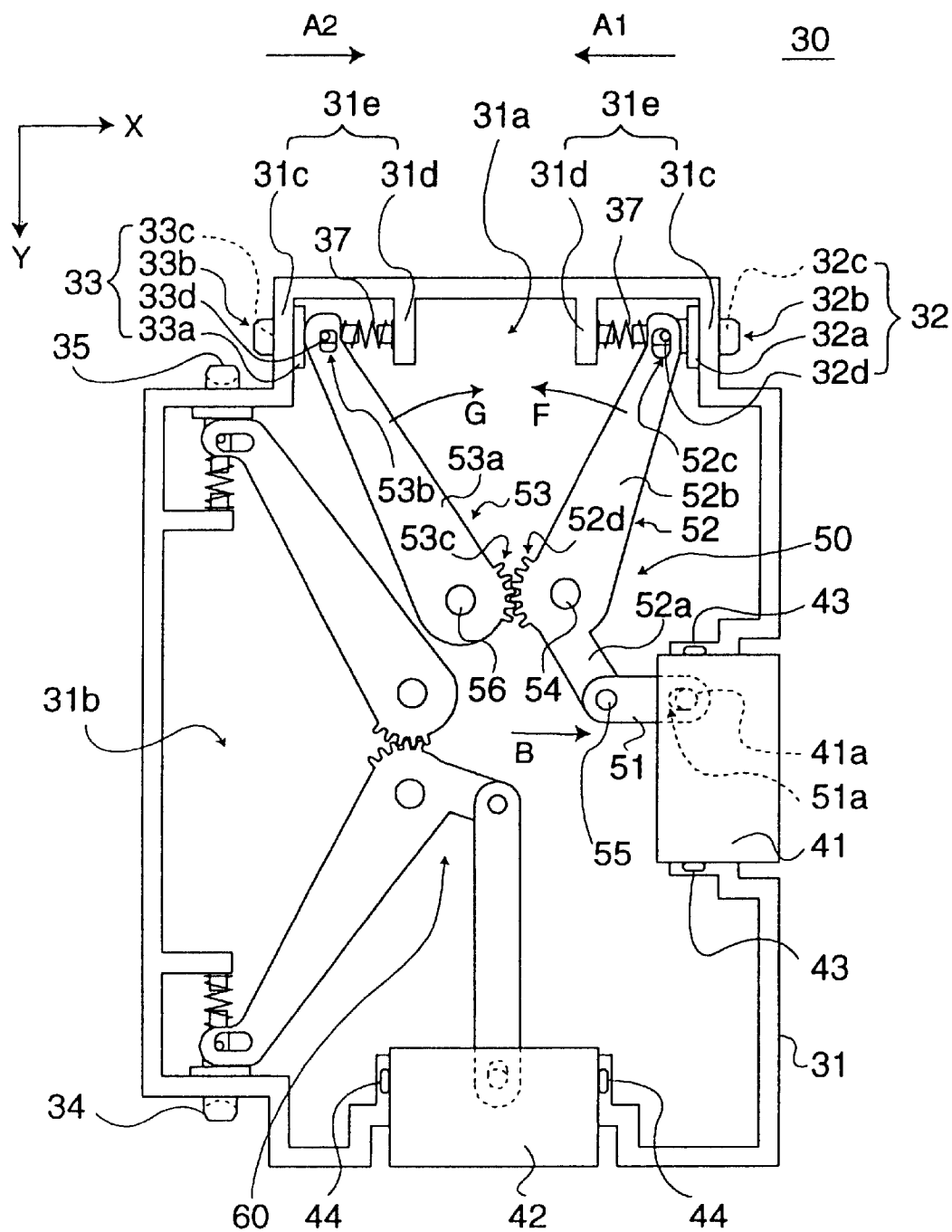
FIG. 2 is a plan view of the cover showing the internal structure of the cover and operation of components therein.

As seen from FIGS. 1 and 2, the cover 30 has a thin box-shaped cover housing 31 made of, for example, a synthetic resin. The cover housing 31 is notched at three corners. The parts between each pair of the notched corners provide a first shaft-accommodating portion 31a and second shaft-accommodating portion 31b, respectively.

A first release lever 41, which is arranged to be pivoted about a pivot shaft 43, is provided on the side of the cover housing 31 opposite to the side presenting the second shaft-accommodating portion 31b. Similarly, a second release lever 42, which is arranged to be pivoted about a pivot shaft 44, is provided on the side of the cover housing 31 opposite to the side presenting the first shaft-accommodating portion 31a.

Referring to FIG. 2, the ends of the first shaft-accommodating portion 31a define shaft supporting sections 31c and 31d that support the support shafts 32 and 33, respectively.

Each support shaft 32, 33 is urged outwardly by a compression coil spring 37 and has a flange 32a, 33a, respectively, as a stopper so that the projected distance is predetermined by the flange.

Figure 5:
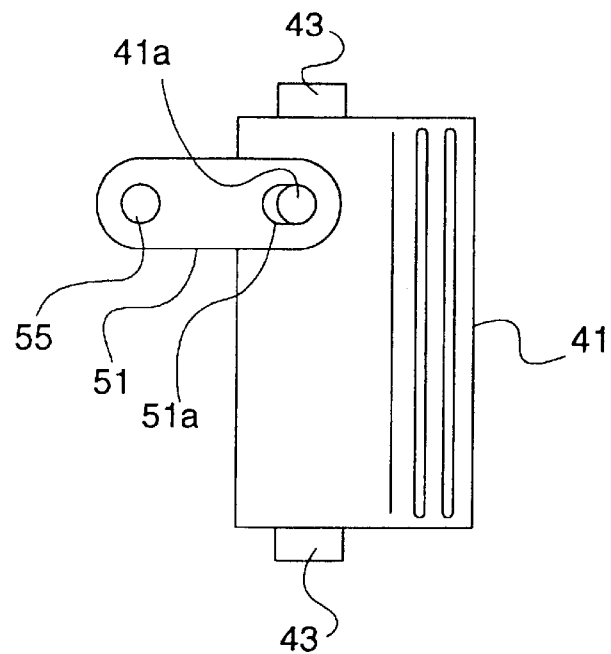
FIG. 5 is a bottom plan view of the first embodiment, showing particularly a release lever.

Referring again to FIG. 2, the cover housing 31 has a first release mechanism 50 that serves to convert a pivotal motion of the first release lever 41 into a linear motion of the support shafts 32 and 33 towards each other. The first release mechanism 50 has a drive link member 51 connected to the first release lever 41, an intermediate link member 52 connected to the drive link member 51, and a driven link member 53, which is connected to the intermediate link member 52. As seen from FIGS. 2 and 5, the drive link member 51 is an elongated tabular member having an elongated hole 51a formed in one end thereof.

Referring now to FIG. 6A, fixed to the first release lever 41 is an actuating pin 41a, which actuates the drive link member 51. The actuating pin 41a is received in the elongated hole 51a of the drive link member 51 with a predetermined play.

Referring back to FIG. 2, the intermediate link member 52 has a connecting portion 52a and an arm portion 52b, which in combination have a substantially L-like form. The intermediate link member 52 is pivotally supported by a fixed pivot shaft 54, which is fixed to the cover housing 31. The connecting portion 52a of the intermediate link member 52 has a length large enough to reach the other end of the drive link member 51 from the fixed pivot shaft 54. The connecting portion 52a is pivotally connected to the drive link member 51 through a connecting pivot shaft 55.

The arm portion 52b of the intermediate link member 52 has an engagement hole 52c at its tip section and the engagement hole 52c is engaged with a pin 32d provided on the support shaft 32 with a predetermined amount of play.

The driven link member 53 has an elongated arm portion 53a and is pivotally supported by a fixed pivot shaft 56 which is fixed to the cover housing 31.

As in the case of the arm portion 52b of the intermediate link member 52, the arm portion 53a of the driven link member 53 is provided at its end with an engagement hole 53b for determining the position of the support shaft 33.

The intermediate link member 52 and the driven link member 53 are provided with teeth 52d and teeth 53c, respectively; the teeth 52d and 53c engage one another so that the driven link member rotates along with the rotation of the intermediate link member 52.

Similar to the first support shafts 32, 33, the second support shafts 34 and 35 are arranged in the second shaft-accommodating portion 31b so as to be movable in the Y direction. The arrangement is such that the support shafts 34 and 35 are moved toward each other through an operation of a second release mechanism 60, when the second release lever 42 is turned. The second release mechanism 60 has the same structure as the first release mechanism 50.

Before a document is placed on the glass plate 12 of the described image reader, the cover 30 lies on the main unit 10 of the image reader 1, such that the first shaft-accommodating portion 31a is placed between the support members 13 and 14 while the second shaft-accommodating portion 31b is positioned between the support member 14 and the support member 15.

In this initial state of the apparatus, the ends of the first support shafts 32 and 33 held in the first shaft-accommodating portion 31a are kept in engagement with the associated engagement holes 13a and 14a, respectively. Likewise, the ends of the second support shafts 34 and 35 held in the second shaft-accommodating portion 31b are kept in engagement with the engagement hole 1 a formed in the support member 15 and the engagement hole 14b formed in the housing 11, respectively.

Figure 6:
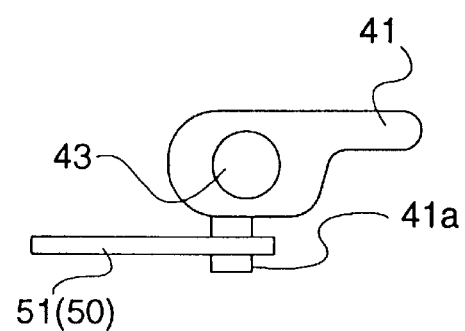
FIGS. 6A and 6B are side views showing the positional relationship between the release lever and a link member in the embodiment.
Figure 6:
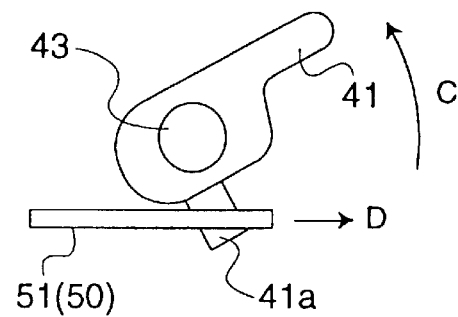

Referring back to FIG. 1, in the case where the image reader 1 is placed such that the side face 11a of the main unit faces a user, when the user wants to open the cover by turning it around the pivot axis defined by the second support shafts 34, 35, the user picks up the second release lever 41 to cause it to pivot upward (as viewed in FIG. 6), so that the actuating pin 41a is turned counterclockwise about the axis of the pivot shaft 43, as indicated by an arrow C in FIG. 6B, thereby actuating the first release mechanism 50.

Operation of the first release mechanism is as follows. As seen from FIG. 6B and FIG. 2, the counterclockwise motion of the actuating pin 41 a pulls the drive link member 51 toward the user, i.e., in the direction of an arrow B in FIG. 2. Connecting pivot shaft 55 transfers this motion of the drive link member 51 to the intermediate link member 52 causing the latter to rotate counterclockwise as indicated by an arrow F in FIG. 2, about the axis of the pivot shaft 54.

Figure 3:
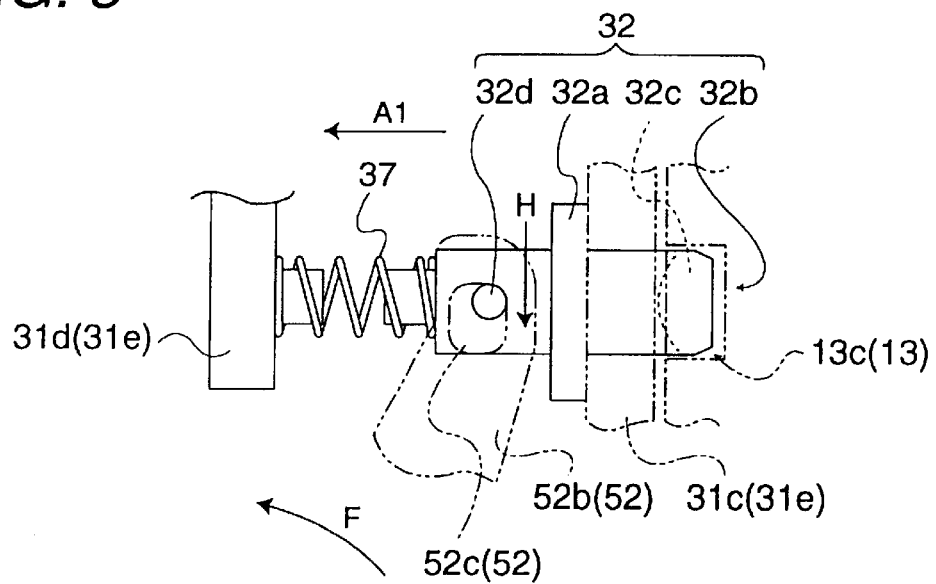
FIG. 3 is a plan view of the first embodiment, showing particularly a movable support shaft and therearound on a greater scale.
Figure 4:
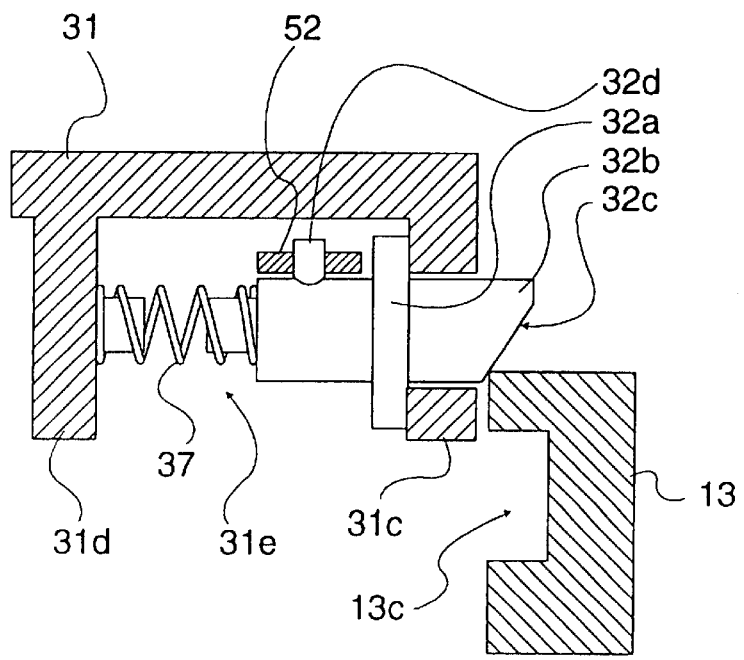
FIG. 4 is a side elevational view showing the movable support shaft and therearound on a greater scale.

As seen from FIGS. 3 and 2, the rotation of the arm portion 52b of the intermediate link member 52 in the direction of the arrow F causes the support shaft 32 to move towards the support shaft 33, i.e., in the direction of an arrow A1. As a result, the support shaft 32 is disengaged from the engagement hole 13a of support member 13. As the support shaft 32 is pulled back by the arm portion 52b in this manner, the engaging pin 32d on the support shaft 32 moves in and relative to the engagement hole 52c of the arm portion 52b in the direction of an arrow H (see FIG. 3).

The above-described rotary motion of the intermediate link member 52 causes the driven link member 53 to rotate clockwise about the fixed pivot shaft 56 as indicated by an arrow G in FIG. 2, due to the meshing engagement between the teeth 53c on the driven link member 53 and the teeth 52d on the intermediate link member 52. Consequently, the support shaft 33 is moved toward the support shaft 32 as indicated by an arrow A2, so as to be disengaged from the engagement hole 14a of the support member 14.

Consequently, the first support shafts 32 and 33 are disengaged from the main unit 10, by the action of the first release mechanism 50, while the second support shafts 34 and 35 are kept in engagement with the main unit 10. Therefore, further lifting of the first release lever 41 by the user causes the cover 30 to pivot upward about the axis of the second support shafts 34 and 35. Thus, the release lever 41 serves also as a handle for turning the cover 30 into its open position.

When a reading operation is finished, the user turns the cover upward into the open position and, after removing the document, he turns the cover 30 back onto the main unit 10. The downward pivotal motion of the cover 30 brings each of cam surfaces 32c and 33c at the respective end 32b, 33b of the support shafts 32 and 33 into sliding contact with an upper edge of the support member 13, so that a force is generated to act against the urging force of the spring 37, whereby each of the support shafts 32, 33 is temporarily pressed into the shaft receiving space 31e, respectively. The first support shaft 32 is allowed to move into the shaft receiving space 31e as indicated by the arrow A1 and the first support shaft 33 is into another shaft receiving space 31e, even though the intermediate link member 52 has not been rotated in the direction of the arrow F (see FIG. 3), by virtue of the mechanical play provided in the engagement between the engaging pin 32d on the support shaft 32 and the engagement hole 52c in the arm portion 52b of the intermediate link member 52.

A locking member (not shown) that retains the support member in the retracted position is provided for at least one of the support members 13, 14, 15. As a result, it is possible to uniformly press the original document on the glass plate 12 even when the document is a thin single sheet of paper.

Where the image reader 1 is located such that the side face 11a faces a user, when the user would like to open the cover by turning it around the pivot axis defined by the support shafts 32 and 33, i.e., the lateral direction, the user may grasp the second release lever 42 and pull it up so that the second cover support section 17 is made inactive while the first cover support section 16 remains active, whereupon the cover can be opened. In addition, when the user lifts the cover 30 by pulling up both of the release levers 41, 42, the cover 30 can be completely separated from the main unit 10. In an embodiment, a selection between two different opening directions of the cover 30, i.e., the direction in which the cover 30 is turned about the pivot axis defined by the first support shafts 32, 33 and the direction in which the cover is turned about the pivot axis defined by the second support shafts 34, 35.

Further, in this embodiment, two of the three support members 13, 14, 15 are required to pivotally hold the cover 30 at the main unit 10. That one of the support members 13 and 15 that is not used can be locked in the retracted position where its top surface is flush with that of the glass plate 12. It is therefore possible to uniformly press a document to be scanned onto the glass plate 12, even when the document is sized and/or positioned to extend beyond one or more edges of the glass plate 12.

Further, the image reader 1 can be situated in any desired orientation without being restricted by the turning direction of the cover 30, because the user can set a document by freely selecting one of the above-described two pivotal directions of the cover 30.

The housing of the described image reader 1 can be installed selectively either in a horizontal posture, in which the plane of the glass plate is held in parallel with a supporting surface, for example, the top surface of a desk, or a vertical posture, in which the glass plate is held perpendicularly to the supporting surface. To enable such selection of the installation posture, base portions for contact with the supporting surface are provided both on the bottom surface, i.e., the surface opposite to the glass plate, and one lateral side surface of the housing. The housing, when installed in the vertical posture, is oriented such that the first release lever 41 faces upward, i.e., such that the lateral side adjacent to the second support shafts 34, 35 faces downward. The glass plate becomes accessible to allow placement of a document, when the user manipulates the cover 30 to pivot it away from the vertically positioned main unit. Therefore, when the image reader is used mainly for the purpose of reading images on sheet-like documents, it is possible to reduce the space or area occupied by the image reader, thus enabling efficient use of a limited area on the desk top.

The described embodiment is only illustrative and various changes and modifications are possible.

Figure 7:
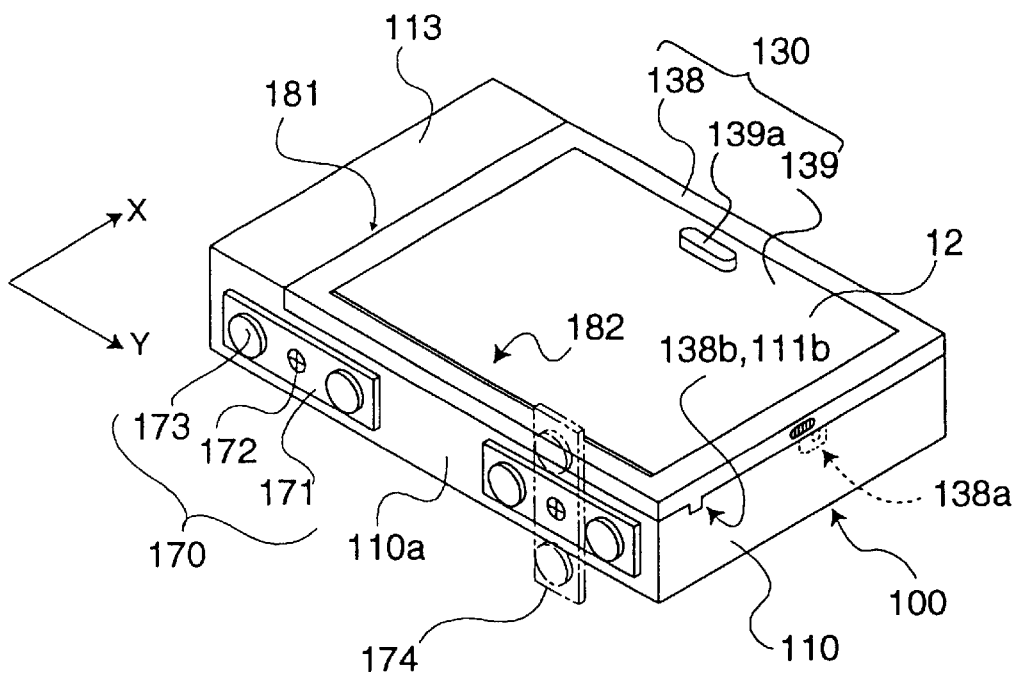
FIG. 7 is a schematic perspective view of a second embodiment of the image reading apparatus in a horizontal posture with a cover closed.
Figure 8:
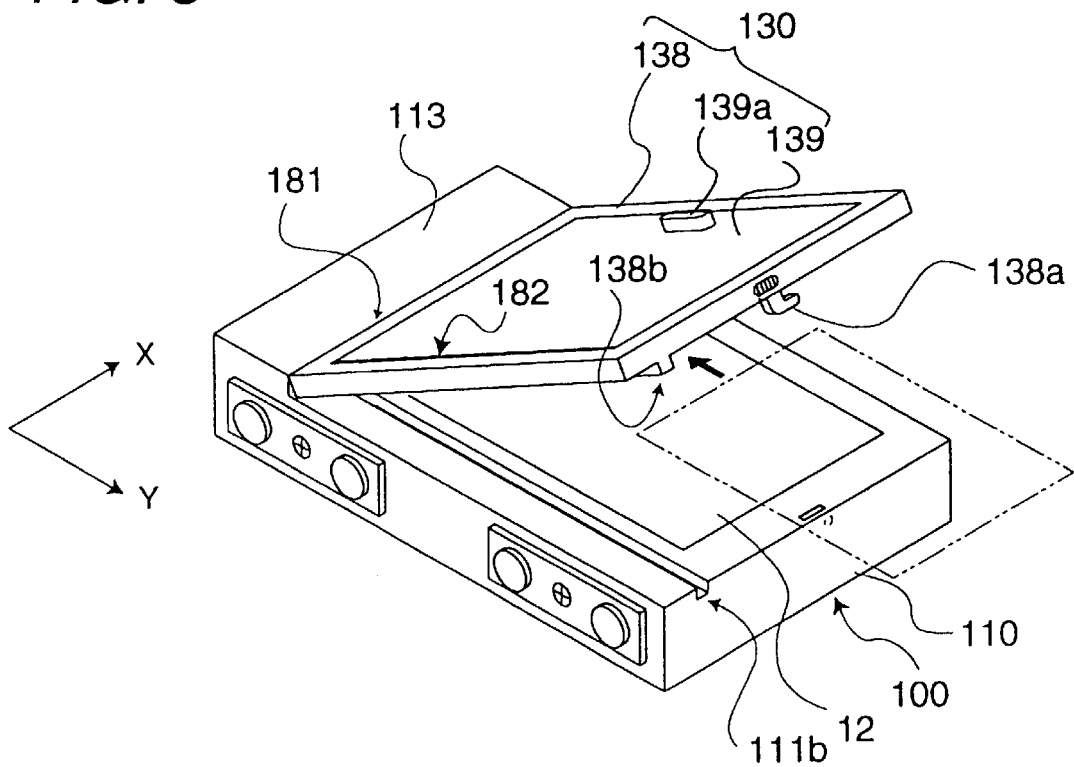
FIG. 8 is a view similar to that of FIG. 7 but with the cover open.
Figure 9:
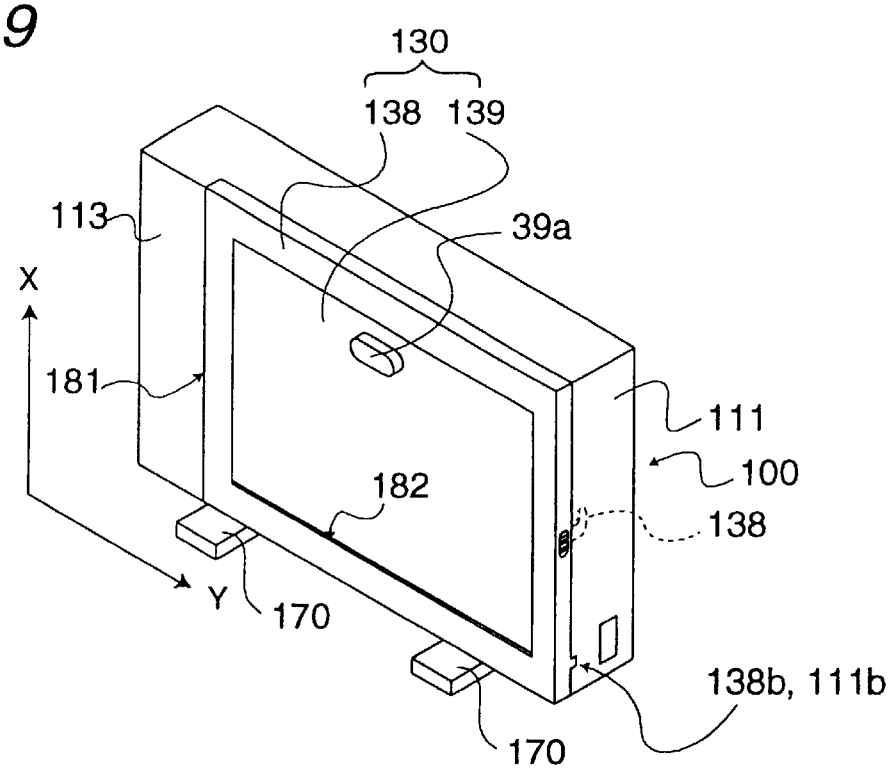
FIG. 9 is a schematic perspective view of the second embodiment of the image reading apparatus in a vertical posture with the cover closed.

With reference to FIGS. 7 to 9, a second embodiment of the image reader will now be described.

Figure 10:
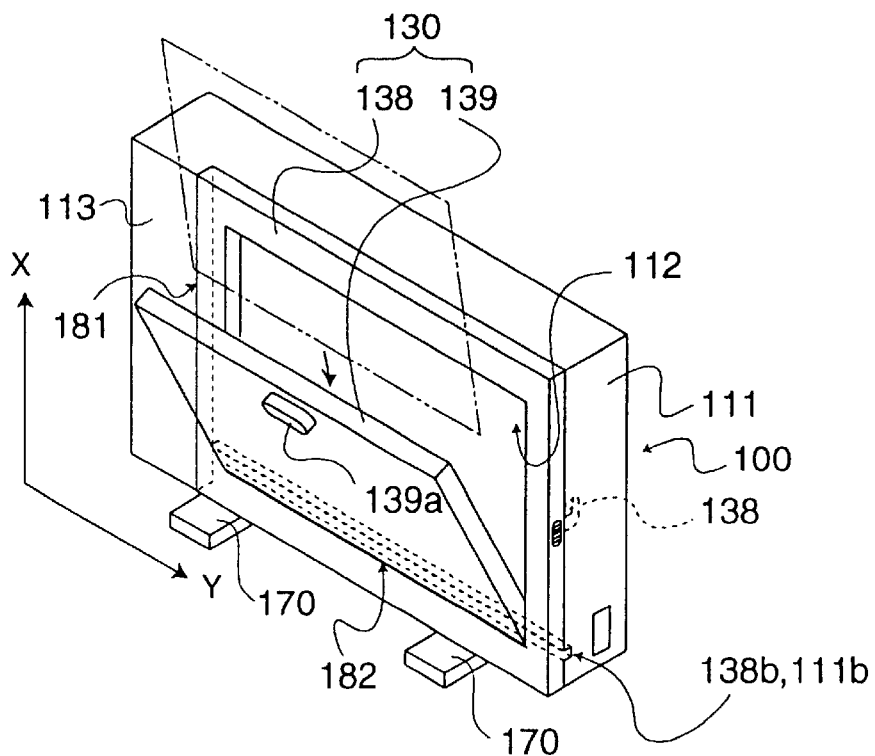
FIG. 10 is a view similar to that of FIG. 9 but with the cover open.

FIG. 7 is a schematic perspective view of the second embodiment of the image reader in a horizontal posture, with a cover in a closed position. FIG. 8 is a view similar to that of FIG. 7 but showing the cover in its open position. FIG. 9 is a schematic perspective view of the second embodiment of the image reader in a vertical posture, with the cover closed. FIG. 10 is a view similar to that of FIG. 9 but showing the cover in its open position.

Referring to FIGS. 7 and 8, the image reader 100 of this embodiment has a main unit 110 in the form of a substantially rectangular parallelepiped, and a substantially rectangular tabular cover unit 130.

The main unit 110 has a housing 111 which is quite similar to that of the preceding embodiment. At least one of two leg members 170 each consisting of a rectangular tabular base member 171 and rubber foot members 173 is rotatably attached by means of a shaft or pin 172 to one of the housing's lateral side surface 110a (referred to as "mounting surface", hereinafter) which is perpendicular to the aforesaid X direction. Each of the leg members 170 is rotatable through an angle of about 90°. Thus, each of the leg members 170 can be turned between an "inactive" position and an "active" position. In the inactive position the longer sides of the base member 171 are substantially in parallel with the longer sides of the mounting surface 110a and the base member 171 is held within the area of the mounting surface 110a as indicated by solid lines in FIG. 7. In the active position, the longer sides of the base member 171 are substantially in parallel with the shorter sides of the mounting surface 110a such that it projects beyond the edges of the mounting surface 110a as shown by two-dot-and-dash lines 174 in FIG. 7.

The cover unit 130 is composed of a frame-like outer cover 138 and an inner cover 139 inside the outer cover 138. The outer cover 138 is hinged to a cover support section 113 so that it can be pivoted about the axis of a first support shaft 181 which is near one shorter side thereof. A catch 138a for retaining the outer cover 138 in its closed position on the main unit 110 is provided on the other shorter side of the outer cover 138 opposite to the first support shaft 181.

A document guide 138b for correctly positioning a document, particularly a sheet-like document, is provided along one longer side of the outer cover 138, which extends in the Y direction. More specifically, the document guide 138b protrudes downward from the lower surface of the outer case 138, i.e., the surface facing the glass plate 112. A groove 111b is formed in the housing 111 so as to receive the document guide 138b when the outer cover 138 is in its closed position.

The inner cover 139 is hinged to the outer cover 138 so that it can be pivoted about the axis of a second support shaft 182 that is provided along an inner peripheral side adjacent to the mounting surface 110a for the leg members 170. A lever or knob 139a having a locking member (not shown in the drawing) for enabling the user to open and close the inner cover 139 is provided on a portion of the inner cover 139 adjacent to that one of its longer sides that is opposite to the second support shaft 182. The locking member prevents the inner cover from opening itself when the image reader is situated in the vertical posture.

The cover unit 130 used in this embodiment has two opening modes: namely, a first mode in which the complete cover unit 130 (outer cover 138 and inner cover 139) is pivoted about a pivot axis defined by the first support shaft 181, and a second mode in which only part of the cover unit, namely the inner cover 139 alone, is turned about a pivot axis defined by the second support shaft 182.

When the image reader 100 is installed such that the glass plate 112 faces upward as shown in FIGS. 7 and 8, the glass plate 112 becomes accessible to allow a document to be placed thereon, as the outer cover 138 together with the inner cover 139 is turned outward about the axis of the first support shaft 181.

The dimensions of the inner cover 139 are about the same as those of an effective scanning area on the glass plate. Any document smaller than the size of this area can be placed on the glass plate simply by opening the inner cover alone.

When the image reader 100 is to be installed such that the above-mentioned mounting surface 110a faces downward as shown in FIGS. 9 and 10, the user rotates the leg member(s) 170 into their active position, so that they may support the image reader 100 in an upright posture such that the glass plate extends substantially perpendicularly to the desk top surface.

The user can then open the inner cover 139 alone in the way described above, while the outer cover 138 is retained on the main unit 110 by means of the catch 138a. With the inner cover 139 thus opened, the user can set a document into the space between the inner cover 139 and the glass plate 112. The document guide 138b of the outer cover 138 is held in engagement with the groove 111b on the main unit 110 and defines the lower end of that space. The document set into this space is automatically registered as it moves by its own weight so that one of its edges abuts the document guide 138b; this ensures that the document will be correctly positioned with respect to the glass plate 112.

The image reader 100 of this embodiment can be installed either in a horizontal posture in which the glass plate 112 faces upward or a vertical posture in which the glass plate 112 extends perpendicularly to, for example, a desk top surface. In each posture of the image reader 100, the user can select between opening/closing the cover unit by turning it about the first support shaft 181, and opening/closing only the inner cover by turning it about the second support shaft 182. It is therefore possible to install the image reader 100 even in a limited space, by setting it in the above-mentioned vertical posture.

Other features and advantages of this second embodiment are the same as those of the first embodiment and, therefore, are not described in order to avoid duplication of description.

Figure 11:
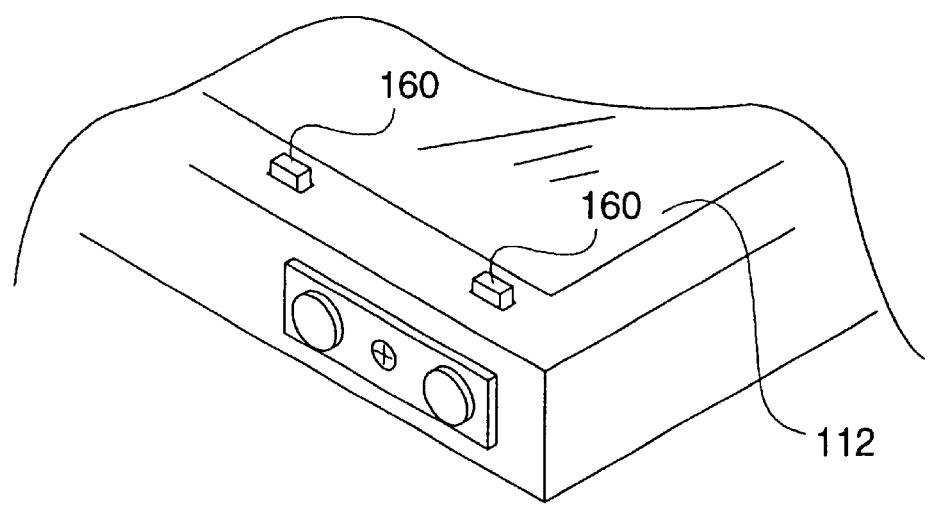
FIG. 11 shows a different arrangement of a document guide.
Figure 12:
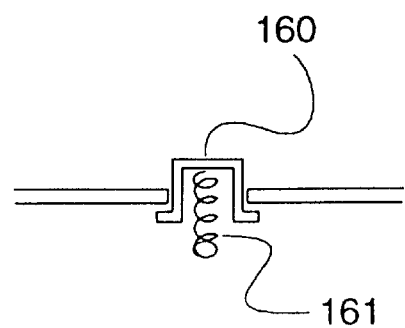
FIG. 12 is a sectional view of the document guide.

FIGS. 11 and 12 show a modification of a document guide usable instead of document guide 138b and groove 111b in the second embodiment but also usable in the first embodiment for the purpose of retaining documents, in particular sheet-like documents, when the apparatus is used in the vertical posture. Referring to FIG. 11, a plurality of projections 160 are arranged along one edge of the glass plate 112. As seen from FIG. 12, which is a sectional view, each of the projections 160 is provided in a hole formed in the housing 111 and urged upward (outward) by a spring 161 to project from the hole. These projections 160 are, thus, easily pressed down into the respective holes by a heavy document such as a book placed thereon, so that the top surface of the projection 160 becomes substantially flush with the surface of the glass plate 112.

The cover unit has a plurality of holes or indentations (not shown) corresponding to the projections 160. When the main unit 110 is placed in the vertical posture, the projections 160 are received in the associated indentations and serve to retain a document placed into the space between the cover unit 130 and the glass plate 112, by supporting the lower edge of the document.

Figure 13:
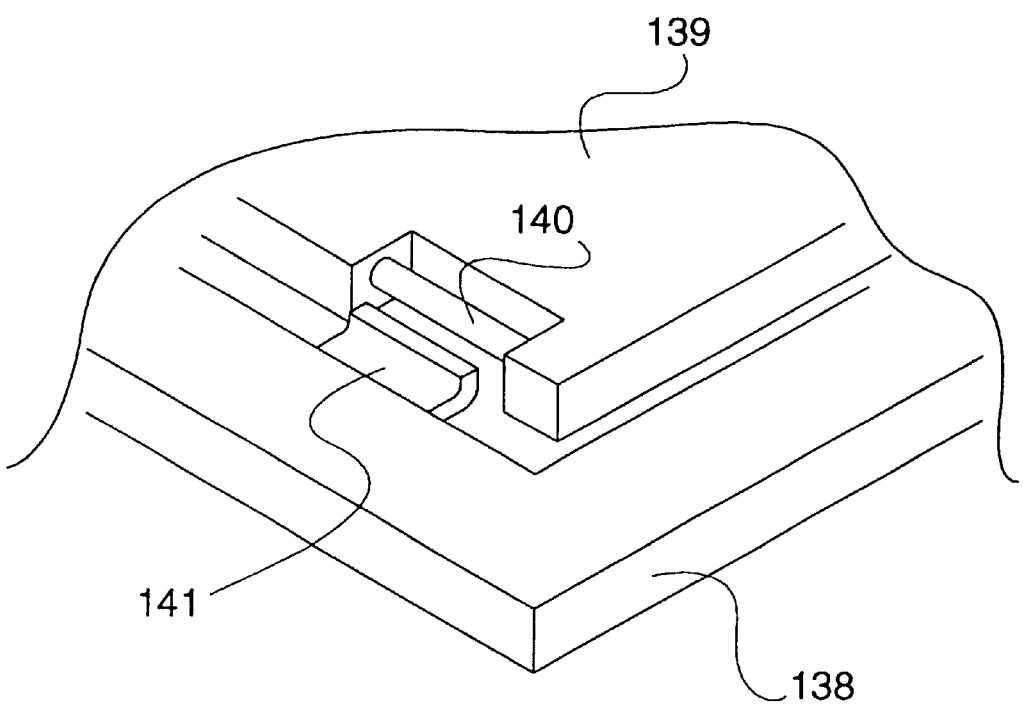
FIG. 13 is a schematic illustration of a different form of a hinge of a cover unit.

FIG. 13 is a schematic illustration of a modification of the second embodiment having a different structure for hinging the inner cover 139 to the outer cover 138.

A hinge is constituted by a bearing portion 141 formed integrally with and projecting from the outer cover 138, and a hinge pin 140 provided on the inner cover 139. The bearing portion 141 is so configured as to embrace only part of the circumference of the hinge pin 140. The inner cover 139 is detachable from the outer cover 138. This structure permits the user to confirm the position of a document by keeping the inner cover 139 aside the image reader 100.

Figure 14:
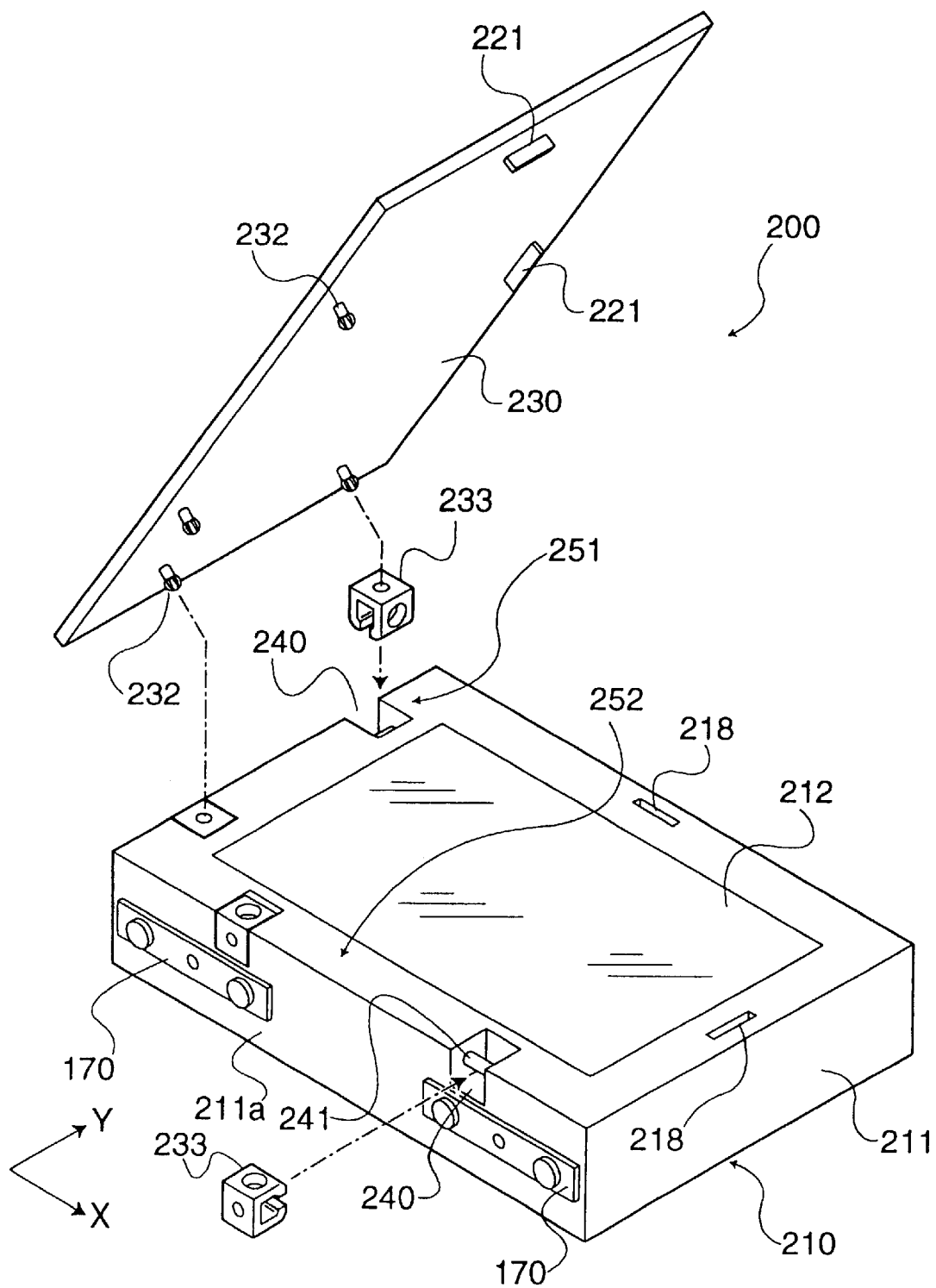
FIG. 14 is an exploded perspective view of a third embodiment of the image reading apparatus of the present invention, with a cover unit separated from a main unit.
Figure 15:
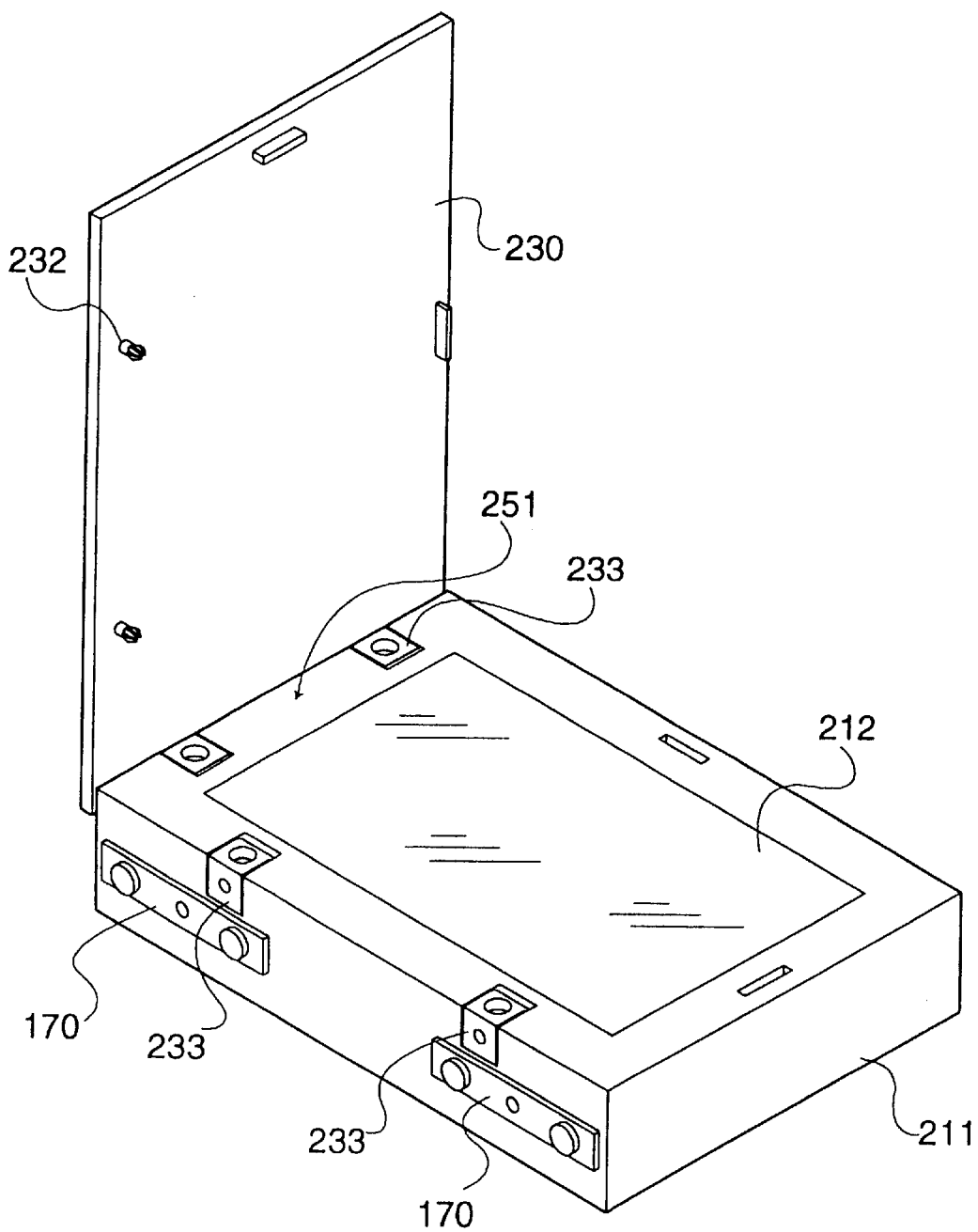
FIG. 15 is a perspective view of the image reading apparatus of FIG. 14, held in a horizontal posture.
Figure 16:
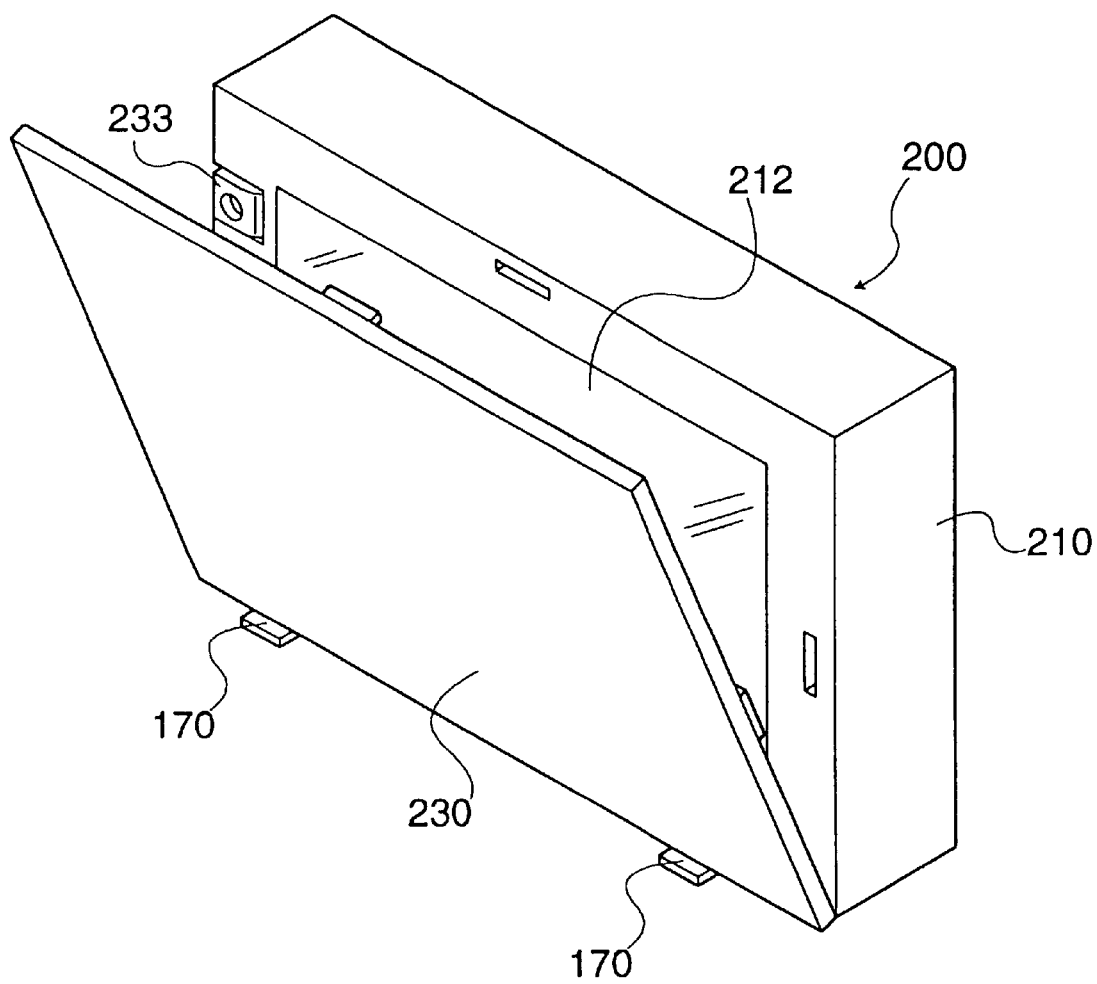
FIG. 16 is a perspective view of the image reading apparatus of FIG. 14, held in a vertical posture.
Figure 17:
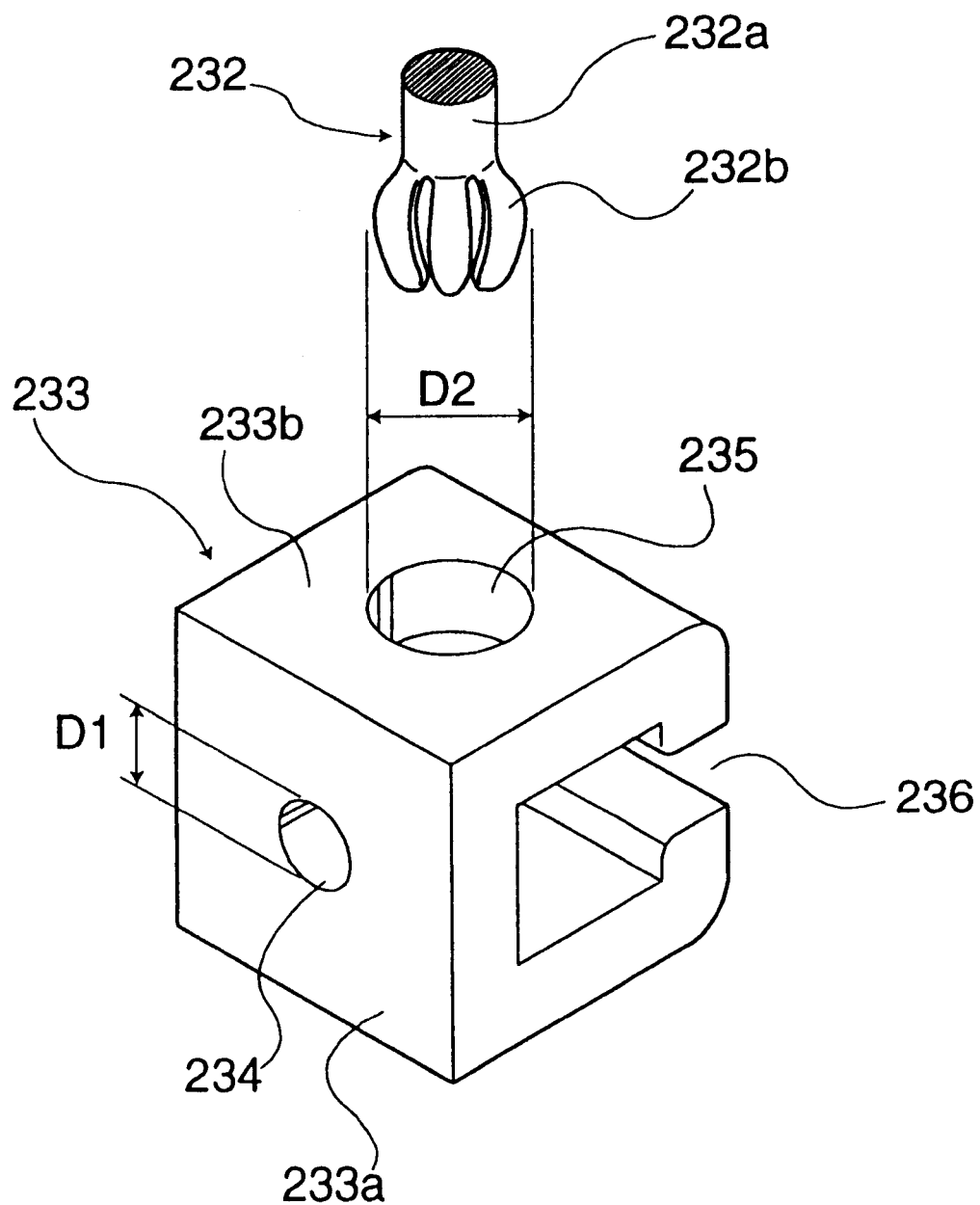
FIG. 17 is a perspective view of a hinge block of the image reading apparatus of FIG. 14.
Figure 18:
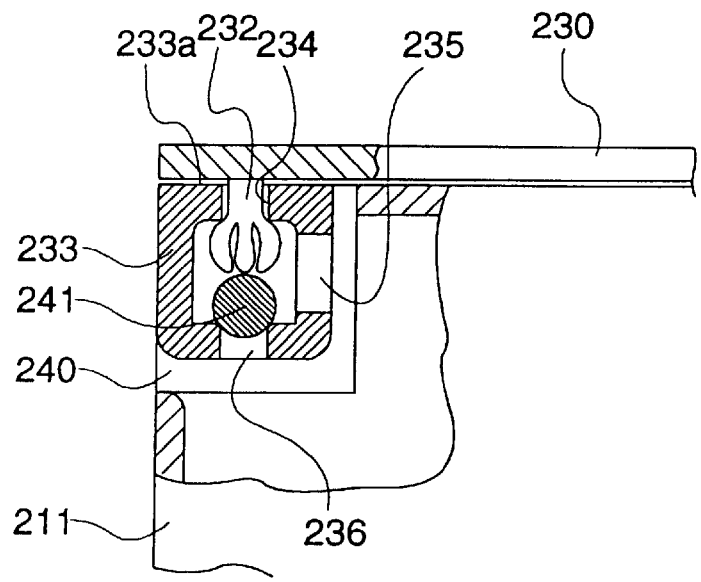
FIGS. 18 and 19 are sectional views of a hinge structure using the hinge block of FIG. 17.
Figure 19:
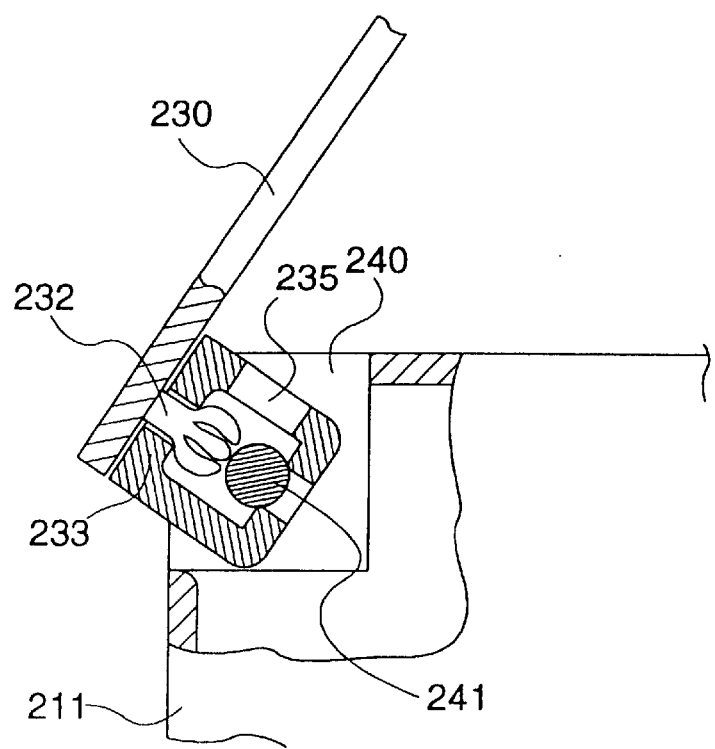

A description will now be given of a third embodiment of the image reader of the present invention, with specific reference to FIGS. 14 to 19. FIG. 14 is an exploded perspective view of this embodiment showing an image reader 200 with a cover unit 230 separated from a main unit 210. FIG. 15 is a perspective view of the image reader of FIG. 14, installed in a horizontal posture. FIG. 16 is a perspective view of the image reader of FIG. 14, held in a vertical posture. FIG. 17 is a perspective view of a hinge block incorporated in the image reader of FIG. 14. FIGS. 18 and 19 are sectional views of a hinge structure employing the hinge block of FIG. 17.

Referring to FIGS. 14 to 19, the cover unit 230 has a rectangular outer contour and is large enough to cover the entire area of the top surface of the main unit 210 where the glass plate 212 is arranged. The hinge structure hinging the cover unit 230 to the main unit 210 comprises two orthogonally arranged hinge sections: namely, a first hinge section 251 extending in the X direction and a second hinge section 252 extending in the Y direction. Thus, the cover unit 230 can be opened and closed by pivoting it in any of two directions: namely, about a pivot axis defined by the first hinge section 251 or about a pivot axis defined by the second hinge section 252.

Each of the first hinge section 251 and the second hinge section 252 comprises hinge units each composed of a snap-fit member 232 fixed to the cover unit 230 and a cooperating hinge block 233 detachably secured to the main unit 210.

As seen from FIG. 17 that shows the detail of the hinge structure, each snap-fit member 232 is made of an elastic material such as a resin, and has a base portion 232a and a plurality of arms 232b extending from the base portion 232a along the curved surface of an imaginary sphere. The arms 232b are elastically deformable. With no force acting on the arms 232b their outer surfaces define a sphere like shape of a certain diameter (referred to as the "unrestricted diameter of the arms"). This diameter is larger than that of an engaging bore 234 formed in the hinge block 233. When the snap-fit member 232 is forced into the engaging bore 234 the arms 232b are radially contracted. After clearing the engaging bore 234, the arms 232b resume their initial forms, so that the snap-fit member 232 is anchored in the hinge block 233. In this state a snap-fit member cannot be disengaged form a hinge block unless a large force is intentionally applied to pull out the snap-fit member 232.

The hinge block 233 is a hollow or a C-shaped cubic block preferably made of a resin and adapted to fit in a recess 240 in the main unit 210 (see FIG. 14). Each of the above mentioned two hinge sections 251 and 252 comprises a plurality of such hinge blocks 233 adapted to fit in a corresponding plurality of recesses 240 (see FIG. 14) arranged along a respective one of the upper side edges of the main unit 210. Each hinge block 233 has a substantially U-like shape, since one of its sides is cut-away to provide an aperture 236 for a pin 241 arranged in the recess 240 of the main unit 210 to come into the internal space of the hinge block 233. Thus, when installed in a respective recess 240, the hinge block 233 is rotatably supported on the pin 241.

The hinge block 233 has a first side 233a (opposite to the side with the aperture 236) having the engaging bore 234 formed therein, and a second side 233b in which a through hole 235 is formed. As described above, the engaging bore 234 is adapted to engage with the arms 232b of the snap-fit member 232 when the latter is pressed into the engaging bore 234. Thus, the inside diameter D1 of the engaging bore 234 is smaller than the unrestricted diameter of the arms 232b, so that the snap-fit member once received in the hollow of the hinge block 233 through the engaging bore 234 is anchored in the hinge block 23 and not easily extractable therefrom. The hinge block 233 is mounted in the recess 240 such that the first side 233a faces upward and is substantially in the same plane as the glass plate 212. The snap-fit member 232 fixed to the cover unit 230 is press-fitted into the engaging bore 234, whereby the snap-fit member 232 and the hinge block 133 in combination serve as a hinge. The hinge block 233 pivots about the pin 241 on the main unit 210, as the cover unit 230 is pivoted between the open and closed positions, as seen from FIGS. 18, 19 which are sectional views illustrative of the pivotal motion of the hinge block 233.

The through hole 235 formed in the second side of the hinge block 233 has a diameter larger than the unrestricted diameter of the arms 232b. When the hinge block 233 is mounted in the recess 240 such that the second side 233b faces upward, the snap-fit member 232 fixed to the cover unit 230 enters the through hole 235 but is not fixed or retained therein.

If the user wishes to use the image forming apparatus in a mode in which the cover unit 230 is hinged by means of the first hinge section 251, two hinge blocks 233 of the first hinge section 251 are mounted such that their first sides 233a face upward, while two hinge blocks 233 of the second hinge section 252 are mounted such that their second sides 233b face upward. With such an arrangement, only the hinge blocks 233 of the first hinge section 251 serve as hinges. Likewise, when the user wishes to use this image forming apparatus in a mode in which the cover unit is hinged by means of the second hinge section 252, the pair of hinge blocks 233 of the second hinge section 252 are mounted such that their first sides 233a face upward, while the pair of hinge blocks 233 of the first hinge section 251 are mounted with their second sides 233b facing upward.

Figure 20:
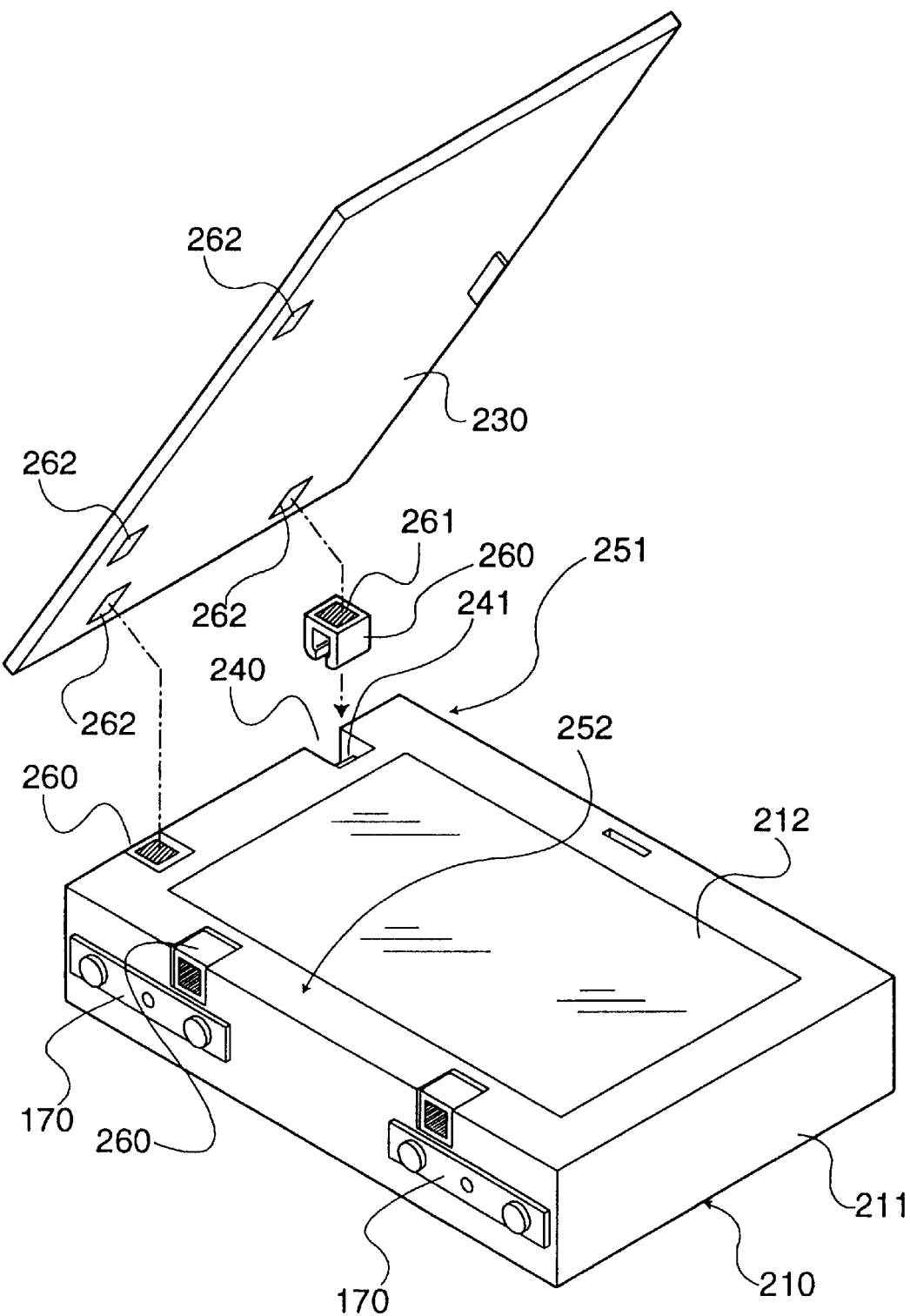
FIG. 20 is a perspective view of a different form of the hinge structure on the cover unit.
Figure 21:
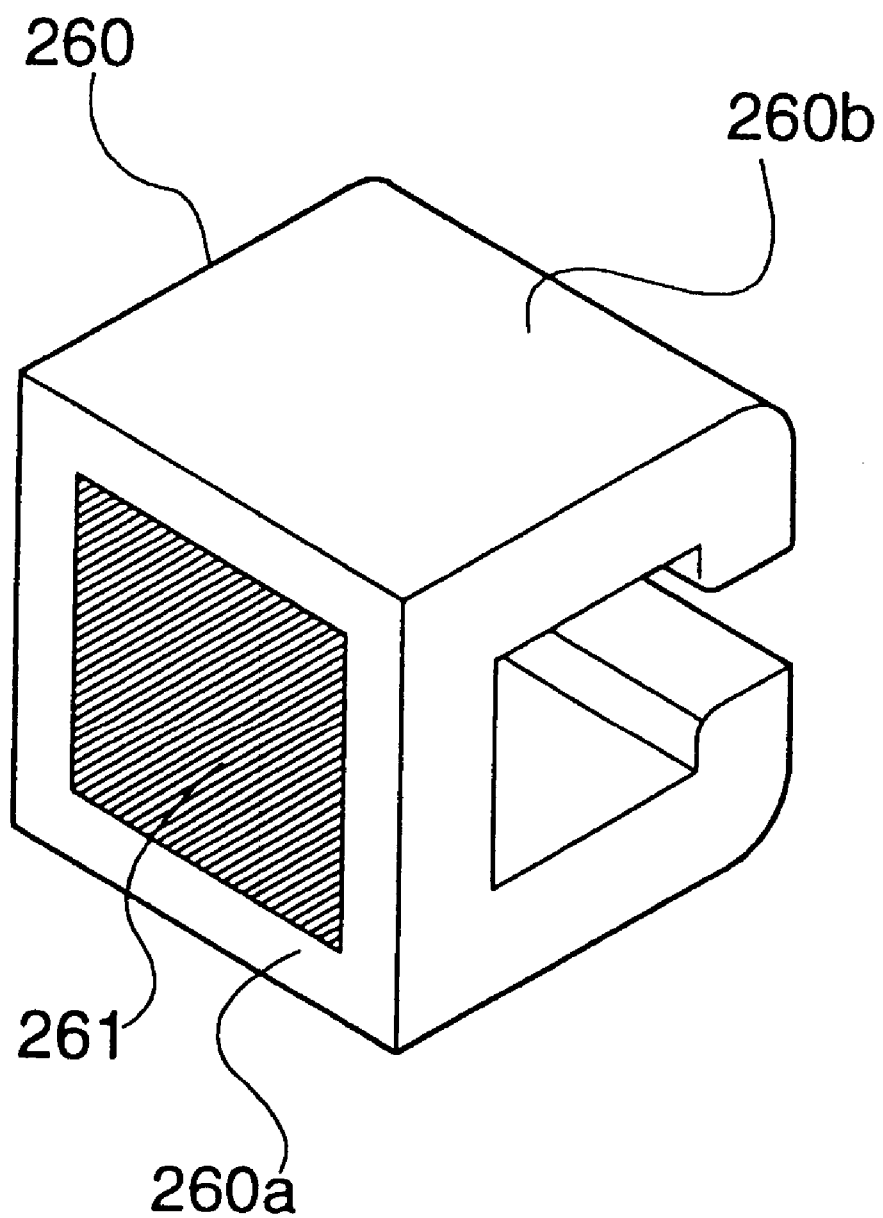
FIG. 21 is a perspective view of a hinge block used in the hinge structure of FIG. 20.

FIGS. 20 and 21 show a modification of the hinge structure used for hinging the cover unit 230 to the main unit 210. As described above with respect with the hinge unit, this hinge unit employs hinge blocks denoted by 260. Unlike the previously described hinge unit using snap-fit members, the hinge units shown in FIGS. 20 and 21 employ magnetic force to fix a hinge block 260 to the cover unit 230.

More specifically, each hinge block is provided with a magnet 261 embedded therein. One face of the magnet 261 is exposed on a first side 260a of the hinge block 260. As described with respect to the hinge block 233, the hinge block 260 is adapted to be mounted either in a posture in which its first side 260a or a second side 260b orthogonal to the first side is in the plane of the glass plate 212.

The cover unit 230 has a plurality of iron pieces 262 arranged at positions corresponding to the hinge blocks 260 on the main unit 210. Each iron piece 262 is adapted to be attracted by the magnet 261 of the associated hinge block 260 when the first side 260a of the hinge block 260 faces upward. Referring to FIG. 20, a pair of hinge blocks 260 of the first hinge section 251 are mounted such that their first sides 260a face upward, while the pair of hinge blocks 260 of the second hinge section 252 are mounted such that their second sides 260b face upward. With this arrangement, only the hinge blocks 260 of the first hinge section 251 function as hinges. The orientations of the hinge blocks 260 may be changed such that the pair of hinge blocks 260 of the second hinge section 252 are mounted such that their first sides 260a face upward, while the pair of hinge blocks 260 of the first hinge section 251 are mounted such that their second sides 260b face upward, so that the cover unit 230 can pivot about the pivot axis defined by the second hinge section 252.

Figure 22:
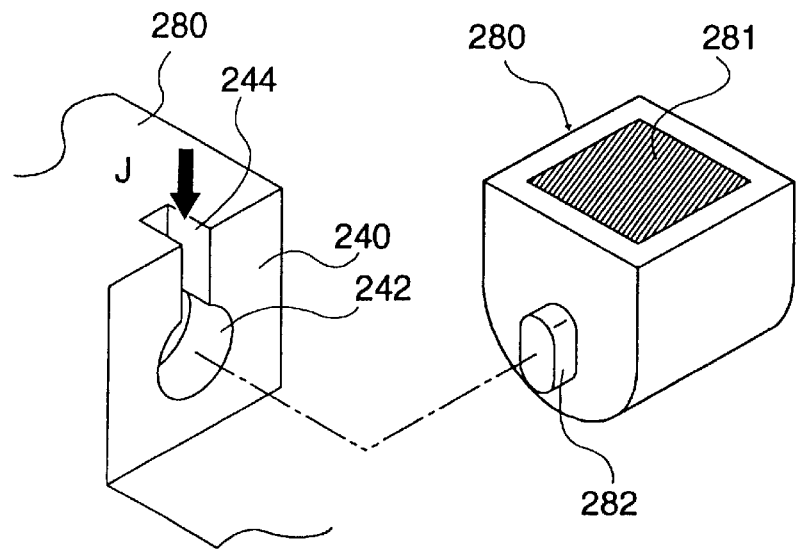
FIG. 22 is an exploded perspective view of still another form of the hinge structure on the cover unit.
Figure 23:
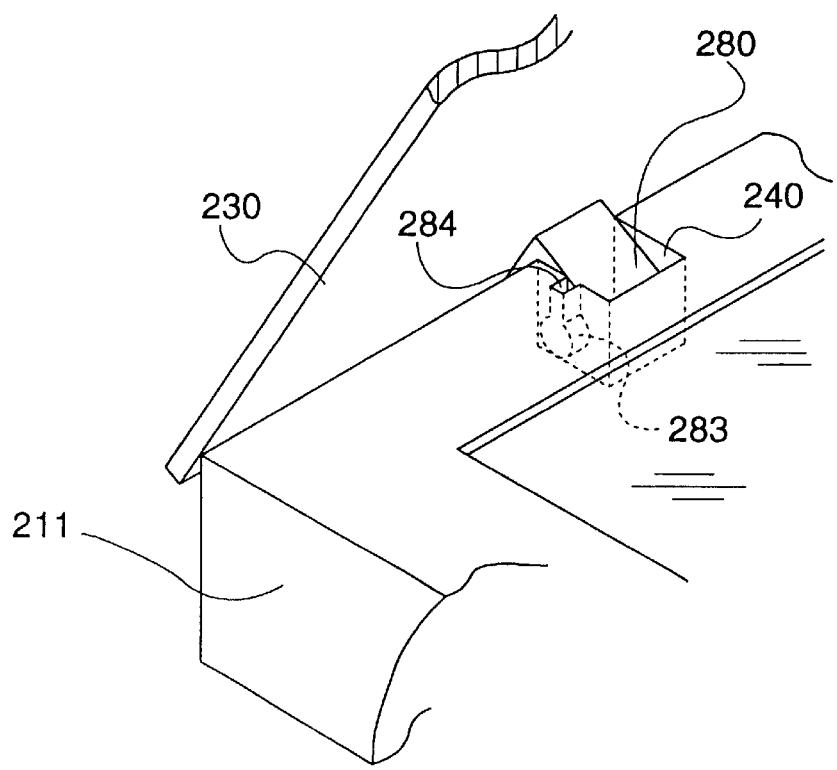
FIG. 23 is a perspective view of the hinge structure of FIG. 20 in an assembled state.

FIGS. 22 and 23 show another modification of the hinge structure used for hinging the cover unit 230 to the main unit 210. As with the aforementioned hinge block 260, each hinge block 280 used in this modification has a magnet 281 embedded therein, for magnetically attracting and fixing a corresponding iron piece (not shown) attached to the cover unit 230. The hinge block is provided at one of its sides with a trunnion 282 having a substantially oval cross-section.

The main unit 210 has recesses 240 corresponding to the hinge blocks 280. Each recess 240 has a bearing hole 242 for rotatably supporting the trunnion 282 and a cutout 244 which provides an entrance for allowing the trunnion 282 to enter the bearing hole 242. The cutout 244 has a width which is smaller than the longer diameter and larger than the shorter diameter of the trunnion 282. Thus, the trunnion 282 can be inserted into the bearing hole 242 through the cutout 244 when the hinge block 280 is so oriented that the longer axis of the trunnion 282 extends vertically, as shown by an arrow J in FIG. 22. Thus, the hinge block 280 can easily be drawn out of the recess 240, whenever the hinge block 280 is held in the posture as shown in FIG. 22. However, when the trunnion 282 is rotated a predetermined angle as a result of a pivotal motion of the cover unit 230, the hinge block 280 is confined in the recess 240, since the trunnion 282 can no more pass the cutout 244.

In use of this arrangement, the iron pieces on the cover unit 230 are attracted by and fixed to the magnets on the hinge blocks 280 which have been mounted in the recesses 240 of the main unit 210. When the user lifts the side of the cover unit 230 opposing the first hinge section 251 to open the cover unit 230, the hinge blocks 280 of the first hinge section 251 rotate together with the cover unit 230 as shown in FIG. 23, thus functioning as hinges. The hinge blocks 280 of the second hinge section 252 are held such that the longer axes of their trunnions extend substantially vertically to allow passage through the respective cutout 244, so that these hinge blocks are moved upward together with the cover unit 230 without hampering the upward pivotal motion of the cover unit 230 about a pivot axis defined by the first hinge section 251.

In this modification, the hinge blocks 280 are fixed to the cover unit 230 only by the magnetic force exerted by the magnets 281. Therefore, the arrangement may be such that the hinge blocks 280 of the second hinge section 252 are separated from the magnets 281 to remain in the recesses 240, while allowing the cover unit 230 to turn away from the main unit. Alternatively, the hinge blocks 280 may be formed integrally with the cover unit 230.

It is also possible that hinge blocks are provided only for one of the two hinge sections. The user may then decide whether he wishes to use them for the first hinge section or the second hinge section, so that either the first hinge section or the second hinge section serves as the hinges. This decision may be changed any time by simply detaching the hinge blocks from their current positions on the cover unit (corresponding to, e.g., the first hinge section) and attaching them to the positions corresponding the other (e.g., the second) hinge section.

Although the described modifications employ a pair of hinge blocks in each of the first hinge section and the second hinge section, a single elongated hinge block is usable in place of the pair of hinge blocks, if such a single hinge block has a sufficiently large length along the axis about which the cover unit 230 is to be turned.

A description will now be given of an embodiment of an image information processing apparatus in accordance with the present invention, with specific reference to FIG. 24.

Figure 24:
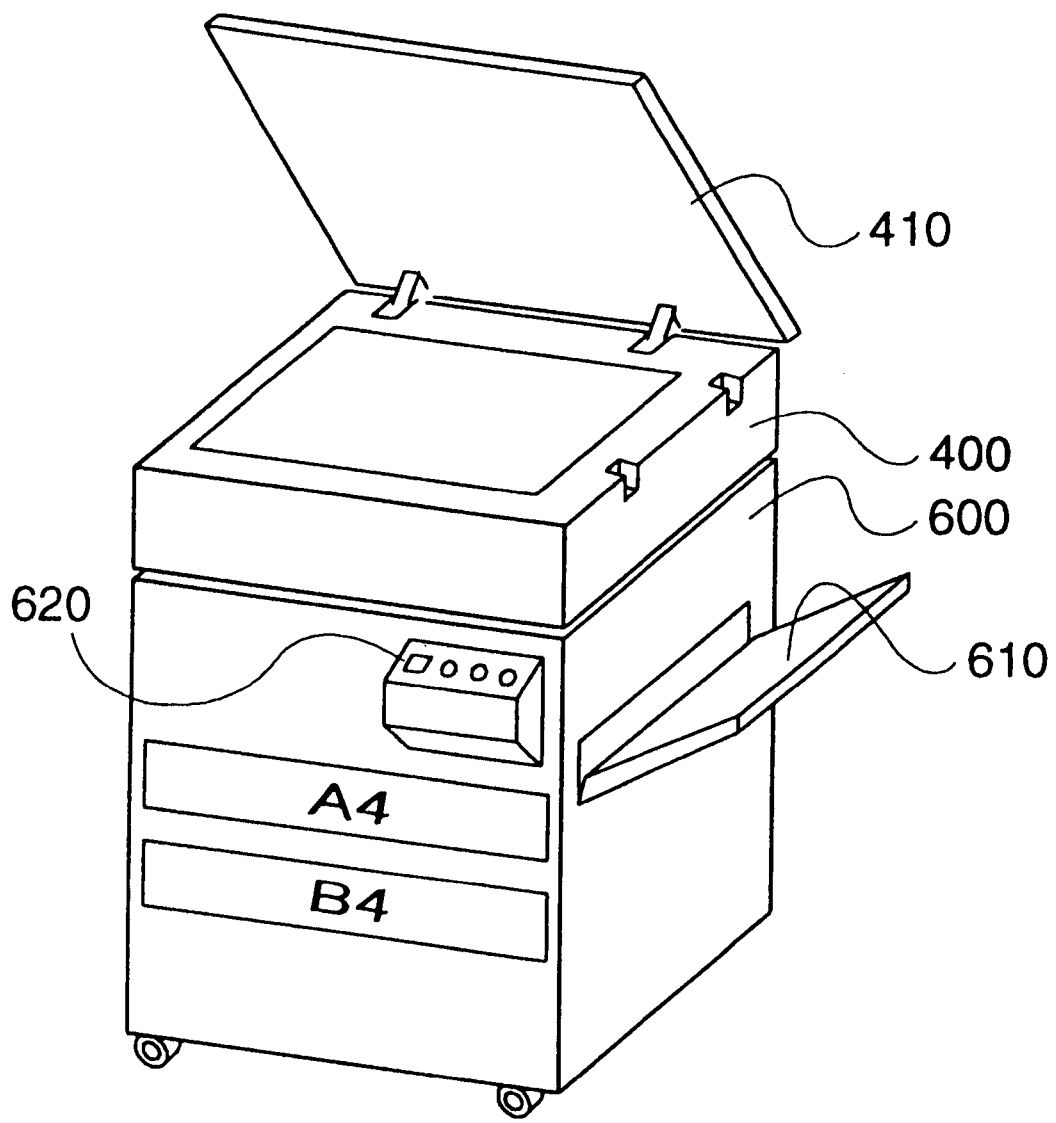
FIG. 24 is a schematic illustration of an image information processing apparatus incorporating an image reading apparatus in accordance with the present invention.

FIG. 24 is a schematic illustration of a copying machine as an embodiment of the image information processing apparatus of the present invention which incorporates the image reader embodying the present invention. The copying machine has a main unit 600 and an image reader 400 carried by the main unit 600. The image reader 400 having a cover 410 which may be any one of the embodiments and modifications described heretofore. Thus, the cover 410 is arranged such that it can be pivoted either in a first direction about an axis extending along a shorter side thereof or in a second direction about an axis extending along a longer side thereof.

The main unit 600 of the copying machine has a printing unit mounted therein. A tray 610 for receiving sheets on which information has been printed by the printing unit is provided on the exterior of the main unit 600. An operation panel 620 provided on the main unit 600 enables the users to input various instructions or commands such as an instruction for producing a copy of a document. The main unit 600 may also have a facsimile function.

The user can select how to install the copying machine in accordance with the space requirement, by suitably selecting one of the directions in which the cover can be turned between the open position and the closed position.

A number of embodiments of the invention have been described. Nevertheless, it will be understood that various modifications may be made without departing from the spirit and scope of the invention. Accordingly, other embodiments are within the scope of the following claims.

What is claimed is:

1. An image reading apparatus, comprising:
   a main unit having a document holding plate on which an original document is to be placed, and an image reading section for reading an image from an original document placed on said document holding plate; and
   a cover secured to said main unit so as to be turned between an open position in which a document can be set on or removed from said document holding plate, and a closed position in which it covers said document holding plate;
   wherein said cover can be turned about a first axis extending in a first direction substantially on the plane of said document holding plate between said open position and said closed position, and wherein at least part of said cover can be turned about a second axis extending in a second direction which is substantially orthogonal to said first direction between said open position and said closed position.

2. An image reading apparatus according to claim 1, wherein said main unit is arranged to be installed on a support plane selectively either in a horizontal posture in which said document holding plate extends substantially in parallel with the support plane or in a vertical posture in which said document holding plate extends perpendicularly to the support plane, and wherein, when said main unit is installed in said vertical posture, one side of said main unit having one of said axes is positioned closer to said support plane than the side of said main unit opposite to said one of said axes, thereby enabling the space on said document holding plate to be accessed for placing said original document from the upper side.

3. An image reading apparatus according to claim 1, further comprising:
   a first supporting shaft arrangement adapted to connect said cover to said main unit along said first axis;
   a second supporting shaft arrangement adapted to pivotally connect said cover to said main unit along said second axis;
   a first release lever adapted to cause said first support shaft arrangement to disengage the connection between said cover and said main unit, while adapted to maintain the connection between said cover and said main unit by said second support shaft arrangement; and
   a second release lever adapted to causing said second support shaft arrangement to disengage the connection between said cover and said main unit, while adapted to maintain the connection between said cover and said main unit by said first support shaft arrangement.

4. An image reading apparatus according to claim 3, wherein at least one of said first and said second support shaft arrangements is movable in a direction to establish the connection between said cover and said main unit, in accordance with the movement of said cover in the closing direction.

5. An image reading apparatus according to claim 3, wherein said first support shaft arrangement and said second release lever are arranged on two opposite sides of said image reading apparatus, and said second support shaft arrangement and said first release lever are arranged on the other two opposite sides of said image reading apparatus.

6. An image reading apparatus according to claim 3, wherein said first and second release levers serve also as handles for enabling the user to turn said cover.

7. An image reading apparatus according to claim 3, further comprising a support member provided on said main unit, adapted to support said first support shaft arrangement or said second support shaft arrangement, said support member being movable between a position where it projects above the plane of said document holding plate and a retracted position where its top face is substantially flush with the plane of said document holding plate.

8. An image reading apparatus according to claim 1, wherein said main unit is arranged to be installed on a support plane selectively either in a horizontal posture in which said document holding plate extends substantially in parallel with the support plane and in a vertical posture in which said document holding plate extends perpendicularly to the support plane, said image reading apparatus further comprising at least one leg member for supporting said main unit on said support plane when said main unit is installed in said vertical posture.

9. An image reading apparatus according to claim 8, wherein said leg member is attached to said main unit so as to be movable between an active position and an inactive position, such that when said main unit is installed in the vertical posture said leg member is set in the active position where it stably supports said main unit in said vertical posture, whereas, when said main unit is installed in said horizontal posture, said leg member is set in the inactive position where it does not obstruct the use of said document holding plate.

10. An image reading apparatus according to claim 8, wherein said main unit has at least one leg member having a base plate rotatably secured to one side of said main unit which is a lateral side when said main unit is installed in said horizontal posture.

11. An image reading apparatus according to claim 2, further comprising a document guide section having at least one projection provided on at least one of said cover and said main unit and arranged along the side of said image reading apparatus on which the latter rests on said support plane when said main unit is installed in said vertical posture.

12. An image reading apparatus according to claim 11, wherein said projection of said document guide section is formed on said cover, and wherein said document guide section further has a groove formed along one side edge of said document holding plate and engageable with said projection.

13. An image reading apparatus according to claim 2, further comprising a document guide section which includes at least one projection disposed along one side edge of said document holding plate which is the lower side edge when said main unit is installed in said vertical posture, and at least one recess formed in said cover and engageable with said projection when said cover is in its closed position.

14. An image reading apparatus according to claim 11, wherein said projection is movable between a projecting position and a retracted position in which it is substantially flush with the plane of said document holding plate, the projection being resiliently urged into said projecting position such that it can be moved into the retracted position by the weight of a document placed on it.

15. An image reading apparatus according to claim 1, further comprising:
a first hinge section adapted to pivot said cover about said first axis; and
a second hinge section adapted to pivot said cover about said second axis;
wherein each of said first hinge section and said second hinge section includes at least one engaging member attached to said cover, a block member engageable with and disengageable from said engaging member, and a supporting portion provided on said main unit at a position corresponding to said at least one engaging member, for rotatably supporting said block member; and
wherein said block member is detachably mountable on said supporting portion either in a first mounting posture or in a second mounting posture, said block member when mounted in said first mounting posture engaging said engaging member on said cover to pivotally connect said cover to said main unit and, when mounted in said second mounting posture, not engaging said engaging member, thus enabling the selection of the direction of pivotal motion of said cover.

16. An image reading apparatus according to claim 15, wherein said supporting portion of said main unit includes a recess for receiving said block member and a shaft which supports said block member for rotation within said recess.

17. An image reading apparatus according to claim 15, wherein said block member has an engaging hole which is exposed on the same side as said document holding plate when said block member is mounted in said first mounting posture, and said engaging member attached to said cover includes an elastic engaging portion which snap-fits into said engaging hole through elastic deformation.

18. An image reading apparatus according to claim 15, wherein said block member has a magnet or a magnetically attractable member exposed in the surface of said block member which faces in the same direction as said document holding plate when said block member is mounted in said first mounting posture, and said engaging member attached to said cover includes a magnetically attractable member or a magnet.

19. An image reading apparatus according to claim 1, further comprising:
a first hinge section adapted to pivot said cover about said first axis; and
a second hinge section adapted to pivot said cover about said second axis;
each of said first and second hinge sections having a support shaft with an elliptic cross-section, in which pivotally secures said cover to said main unit, a bearing portion formed in said main unit and having a substantially circular hole, in which rotatably bears said support shaft, and an entrance having a width smaller than the lengths of the longer axis and larger than the length of the shorter axis of said elliptic cross-section of said support shaft, adapted to permit said support shaft to enter said bearing portion through said entrance when said cover is in said closed position.

20. An image reading apparatus according to claim 1, wherein said cover has an outer cover arranged to pivot about said first axis and an inner cover pivotally supported on said outer cover so that it can be turned relative to said outer cover about said second axis, said outer cover and said inner cover being turned together when said outer cover is pivoted about said first axis, and said inner cover alone is turnable about said second axis without causing said outer cover to turn.

21. An image information processing apparatus which handles image information, comprising:
image reading means including:
a main unit having a document holding plate on which an original document is to be placed, and an image reading section for reading an image from an original document placed on said document holding plate, and a cover secured to said main unit so as to be turned between an open position in which a document can be set on or removed from said document holding plate, and a closed position in which it covers said document holding plate, said cover being turnable about a first axis extending in a first direction substantially on the plane of said document holding plate between said open position and said closed position, and wherein at least part of said cover is turnable about a second axis extending in a second direction which is substantially orthogonal to said first direction between said open position and said closed position; and
means for acquiring image information from said image reading means and using the acquired image information.

22. An image information processing apparatus according to claim 21, wherein said means for acquiring and using image information includes printing means to enable copying of said image information.

23. An image information processing apparatus which handles image information, comprising:
a main unit having a document holding plate on which an original document is to be placed, and an image reading section for reading an image from an original document placed on said document holding plate, and a cover secured to said main unit so as to be turned between an open position in which a document can be set on or removed from said document holding plate, and a closed position in which it covers said document holding plate, said cover being turnable about a first axis extending in a first direction substantially on the plane of said document holding plate between said open position and said closed position, and wherein at least part of said cover is turnable about a second axis extending in a second direction which is substantially orthogonal to said first direction between said open position and said closed position; and
an image information acquisition unit connected to the main unit.

* * * * *